(12) United States Patent
Matsumura et al.

(10) Patent No.: US 7,767,723 B2
(45) Date of Patent: Aug. 3, 2010

(54) EXPANDABLE RESIN PARTICLES OF STYRENE-MODIFIED STRAIGHT-CHAIN AND LOW-DENSITY POLYETHYLENNE, PROCESS THE PRODUCTION THEREOF, PRE-EXPANDED PARTICLES, AND FOAMS

(75) Inventors: Hideyasu Matsumura, Shiga (JP); Yasutaka Tsutsui, Shiga (JP)

(73) Assignee: Sekisui Plastics Co., Ltd., Osaka (JP)

( * ) Notice: Subject to any disclaimer, the term of this patent is extended or adjusted under 35 U.S.C. 154(b) by 680 days.

(21) Appl. No.: 10/540,866

(22) PCT Filed: Mar. 22, 2004

(86) PCT No.: PCT/JP2004/003834

§ 371 (c)(1),
(2), (4) Date: Jun. 27, 2005

(87) PCT Pub. No.: WO2004/085527

PCT Pub. Date: Oct. 7, 2004

(65) Prior Publication Data

US 2006/0063847 A1 Mar. 23, 2006

(30) Foreign Application Priority Data

Mar. 25, 2003 (JP) ............................. 2003-082990

(51) Int. Cl.
*C08J 9/16* (2006.01)
*C08J 9/18* (2006.01)
*B22C 1/22* (2006.01)
*B29C 44/34* (2006.01)

(52) U.S. Cl. ............................. 521/56; 521/59; 521/60; 521/139; 521/142

(58) Field of Classification Search .................. 521/142, 521/56, 59, 60, 139
See application file for complete search history.

(56) References Cited

U.S. PATENT DOCUMENTS

| | | | | | |
|---|---|---|---|---|---|
| 3,963,816 | A | * | 6/1976 | Smith | 264/53 |
| 4,368,218 | A | * | 1/1983 | Senda et al. | 427/222 |
| 6,608,150 | B1 | * | 8/2003 | Wicher | 526/73 |

FOREIGN PATENT DOCUMENTS

| | | |
|---|---|---|
| JP | 50-127965 | 10/1975 |
| JP | 51-46138 | 12/1976 |
| JP | 52-10150 | 3/1977 |
| JP | 58-53003 | 11/1983 |
| JP | 62-59642 | 3/1987 |
| JP | 1-284536 | 11/1989 |
| JP | 4-183706 | 6/1992 |
| JP | 52-76372 | 6/1997 |
| JP | 2668384 | 7/1997 |

OTHER PUBLICATIONS

English translation of JP 01-284536 provided by Schreiber Translations.*
English Language Abstract of JP 62-59642.
English Language Abstract of JP 1-284536.
English Language Abstract of JP 4-183706.

* cited by examiner

*Primary Examiner*—James Seidleck
*Assistant Examiner*—Melissa Rioja
(74) *Attorney, Agent, or Firm*—Greenblum & Bernstein, P.L.C.

(57) ABSTRACT

According to the present invention, there is provided expandable beads of a styrene-modified linear low-density polyethylene-based resin comprising a volatile blowing agent and a base resin, the base resin containing more than 50 to 1000 parts by weight of a polystyrene-based resin component relative to 100 parts by weight of a non-crosslinked linear low-density polyethylene-based resin component, wherein the base resin contains less than 2 wt % of a gel component comprising a graft polymer of the polystyrene-based resin component and the low-density polyethylene-based resin component.

20 Claims, 1 Drawing Sheet

Fig. 1

EXPANDABLE RESIN PARTICLES OF STYRENE-MODIFIED STRAIGHT-CHAIN AND LOW-DENSITY POLYETHYLENNE, PROCESS THE PRODUCTION THEREOF, PRE-EXPANDED PARTICLES, AND FOAMS

TECHNICAL FIELD

The present invention relates to expandable particles of a styrene-modified linear low-density polyethylene-based resin, production methods therefor, pre-expanded particles and expanded molded articles.

BACKGROUND ART

A polyethylene-based resin foam is generally used as a packing material owing to its high resilience and excellent oil and impact resistance. The polyethylene-based resin foam, however, has drawbacks that its stiffness and compressive strength are low. On the other hand, a polystyrene-based resin foam is excellent in stiffness, but has a drawback that it is brittle.

To overcome such drawbacks, Japanese Examined Patent Publication No. SHO 51 (1976)-46138, Japanese Examined Patent Publication No. SHO 52 (1977)-10150, Japanese Examined Patent Publication No. SHO 58 (1983)-53003, and Japanese Unexamined Patent Publication No. SHO 62 (1987)-59642 disclose methods for obtaining expandable particles of a styrene-modified polyethylene-based resin by impregnating a styrene monomer into a polyethylene-based resin for polymerization.

Examples of the polyethylene-based resin used in the method substantially include low-density polyethylene, high-density polyethylene, and an ethylene-vinyl acetate copolymer. However, where these resins are used, styrene is not sufficiently dispersed into polyethylene, and thus polyethylene needs to be cross-linked to provide sufficient stiffness and impact resistance. The cross-linking of polyethylene, however, causes a gel component comprising a cross-linked polymer to be generated.

To solve the above-mentioned problem, Japanese Patent No. 2668384 discloses a method for obtaining an expanded molded article of a modified polyethylene-based resin excellent in stiffness and impact resistance. In this method, 100 parts by weight of non-crosslinked linear low-density polyethylene-based resin particles, 5 to 300 parts by weight of a vinyl aromatic monomer, and 1 to 3 parts by weight of a polymerization initiator relative to 100 parts by weight of the vinyl aromatic monomer are dispersed in an aqueous medium. Then, a suspension thus obtained is heated at such a temperature that polymerization of the monomer does not substantially take place for impregnation of the monomer into an inside and a surface of the polyethylene-based resin particles. Subsequently, the temperature of the suspension is raised to polymerize the monomer, as a result the expanded molded article of the modified polyethylene-based resin is obtained by micro-dispersion of a vinyl aromatic polymer in polyethylene.

In this method, however, the polymerization is carried out after the monomer is fully impregnated into polyethylene. Accordingly, a monomer content in polyethylene is limited. When a large amount of the monomer needs to be impregnated into polyethylene, there is a problem that the remaining monomer which is unimpregnated into polyethylene is polymerized and that a large amount of polymer powder is generated. Also, where a ratio of polyethylene to the vinyl aromatic polymer is high, a retention of a blowing agent is poor and thus a reduction in density of the expanded molded article is difficult. Furthermore, since an amount of the polymerization initiator used in the method is as high as 1 to 3 parts by weight, a molecular weight of the vinyl aromatic polymer is small, making it difficult to provide a molded article having a sufficient strength.

In Examples of the above-mentioned patent, a styrene monomer is added to linear low-density polyethylene-based resin particles having a melting point of 122° C. for polymerization at 115° C. (the melting point of the resin particles is not specified in Examples, but the present inventors confirmed from the product name of the resin particles described in Examples that the particles have the above-mentioned melting point). The polymerization at this temperature often results in graft polymerization of styrene monomer on a polyethylene chain. Consequently, in a resin obtained, a gel component derived from cross-linking is not generated, but instead, a gel component derived from the graft polymerization is generated. Hereinafter, the term "graft polymer" means a gel component containing polystyrene, and the term "crosslinked polymer" means a gel component substantially not containing polystyrene.

Where styrene monomer is impregnated into a polyethylene-based resin for polymerization to obtain a resin which is subsequently impregnated with a blowing agent and molded by heating to obtain an expanded molded article, polyethylene needs to be cross-linked as mentioned above for providing sufficient stiffness and impact resistance. However, when the expanded molded product thus obtained is collected for recycled use thereof, a gel component generated by the cross-linking is contained in a molten resin of the expanded molded article, thereby causing the recycling of the expanded molded article to be difficult.

Accordingly, there has been desired development of expandable particles of a styrene-modified linear low-density polyethylene-based resin which are capable of widely changing a ratio of styrene monomer to polyethylene and suppressing generation of a gel component derived from cross-linking or graft polymerization, and which provide an expanded molded article having sufficient strength.

DISCLOSURE OF INVENTION

The object of the present invention is to provide expandable particles of a styrene-modified linear low-density polyethylene-based resin for production of an expanded molded article which has excellent impact resistance and physical properties and which can be readily recycled by minimizing generation of a gel component derived from graft polymerization etc. of styrene on a polyethylene chain.

The present inventors made an extensive study to achieve the above-mentioned object. Consequently, the present inventors found that by adopting linear low-density polyethylene and by adding a styrene monomer to polyethylene for polymerization at a specific range of temperatures under the presence of a specific amount of an initiator, there are provided the expandable particles of a styrene-modified linear low-density polyethylene-based resin. The expandable particles thus obtained are not cross-linked, and provide an expanded molded article which sufficiently exerts toughness of polyethylene and stiffness of polystyrene. Also, the expandable particles do not generate the gel component that impairs recyclability of the expanded molded article. Thus, the present invention is completed.

According to the present invention, there is provided a method for producing expandable particles of a styrene-modified linear low-density polyethylene-based resin comprising, in the order recited, the steps of:

dispersing 100 parts by weight of non-crosslinked linear low-density polyethylene-based resin particles, 50 to 1000 parts by weight of a styrene-based monomer, and 0.1 to 0.9 parts by weight of a polymerization initiator relative to 100 parts by weight of the styrene-based monomer into a suspension containing a dispersant;

impregnating the styrene-based monomer into the low-density polyethylene-based resin particles by heating a resultant dispersion at such a temperature that polymerization of the styrene-based monomer does not substantially take place;

performing polymerization of the styrene-based monomer at a temperature of (T−15) to (T−8)° C. or (T+1) to (T+5)° C. (where T° C. is a melting point of the low-density polyethylene-based resin particles); and impregnating a volatile blowing agent into the resin particles during or after the polymerization, whereby resin components of the expandable particles contain a gel component comprising less than 2 wt % of a graft polymer.

According to another aspect of the present invention, there is also provided a method for producing expandable particles of a styrene-modified linear low-density polyethylene-based resin comprising, in the order recited, the steps of:

dispersing 100 parts by weight of non-crosslinked linear low-density polyethylene-based resin particles, 30 to 300 parts by weight of a styrene-based monomer, and 0.1 to 0.9 parts by weight of a polymerization initiator relative to 100 parts by weight of the styrene-based monomer into a suspension containing a dispersant;

impregnating the styrene-based monomer into the low-density polyethylene-based resin particles by heating a resultant dispersion at such a temperature that polymerization of the styrene-based monomer does not substantially take place;

performing a first polymerization of the styrene-based monomer at a temperature of (T−15) to (T−8)° C. or (T+1) to (T+5)° C. (where T° C. is a melting point of the low-density polyethylene-based resin particles);

adding a styrene-based monomer and 0.1 to 0.9 parts by weight of a polymerization initiator relative to 100 parts by weight of the styrene-based monomer when a conversion ratio of polymerization reaches to 80 to 99.9%, and performing impregnation of the styrene-based monomer into the polyethylene-based resin particles and a second polymerization of the styrene-based monomer at a temperature of (T−15) to (T−8)° C. or (T+1) to (T+5)° C. (where T° C. is a melting point of the polyethylene-based resin particles) (wherein a total amount of the styrene monomers used in the first and second polymerizations is more than 50 parts by weight and not more than 1000 parts by weight relative to 100 parts by weight of the low-density polyethylene-based resin particles); and impregnating a volatile blowing agent into the resin particles during or after the polymerization, whereby resin components of the expandable particles contain a gel component comprising less than 2 wt % of a graft polymer.

According to still another aspect of the present invention, there is provided expandable particles of a styrene-modified linear low-density polyethylene-based resin comprising a volatile blowing agent and a base resin, the base resin containing more than 50 to 1000 parts by weight of a polystyrene-based resin component relative to 100 parts by weight of a non-crosslinked linear low-density polyethylene-based resin component, wherein the base resin contains less than 2 wt % of a gel component comprising a graft polymer of the polystyrene-based resin component and the low-density polyethylene-based resin component.

According to further aspect of the present invention, there is provided pre-expanded particles having a bulk density of 20 to 200 kg/m$^3$, obtained by pre-expanding the above-mentioned expandable particles of the styrene-modified linear low-density polyethylene-based resin.

According to a still further aspect of the present invention, there is provided an expanded molded article having a density of 20 to 200 kg/m$^3$, obtained by expansion molding of the above-mentioned pre-expanded particles.

BEST MODE FOR CARRYING OUT THE INVENTION

Expandable particles of a styrene-modified linear low-density polyethylene-based resin (hereinafter referred to as expandable resin particles) obtained by the production method of the present invention comprise a volatile blowing agent and a base resin containing a non-crosslinked linear low-density polyethylene-based resin component and a polystyrene-based resin component.

As the non-crosslinked linear low-density polyethylene-based resin component (hereinafter referred simply to as a polyethylene-based resin component) used in the present invention, a copolymer of ethylene and an α-olefin can be mentioned.

Examples of the α-olefin include 1-butene, 1-pentene, 1-hexene, 3,3-dimethyl-1-butene, 4-methyl-1-pentene, 4,4-dimethyl-1-pentene, and 1-octene. Among those, 1-butene and 1-hexene are preferable.

A ratio of ethylene to the α-olefin may vary depending upon physical properties desired and preferably in a range of 1:0.01 to 1:0.1 (weight ratio). The term "low-density" means a density in a range of 0.910 to 0.925 g/ml.

Low-density polyethylene, high-density polyethylene, an ethylene-propylene copolymer, an ethylene-vinyl acetate copolymer and an ethylene-acrylic acid copolymer which have a cross-link and/or a branched chain, and two or more types of these polymers may be used to such an extent that a desirable effect of the invention is not suppressed.

Examples of the polystyrene-based resin component include resin components derived from monomers such as styrene, α-methylstyrene, vinyltoluene, and chlorostyrene.

An amount of the polystyrene-based resin component is 50 to 1000 parts by weight, and preferably 100 to 900 parts by weight relative to 100 parts by weight of the polyethylene-based resin component. Where the amount of the polystyrene-based resin component is less than 50 parts by weight, a characteristic of the polyethylene-based resin component, i.e., fine stiffness is hardly displayed. Furthermore, due to its poor retention of the volatile blowing agent, a reduction in density of an expanded molded product is difficult and expansion-moldability is reduced. Where the amount of the polystyrene-based resin component exceeds 1000 parts by weight, characteristics of the polyethylene-based resin component, i.e., high resilience and excellent oil and impact resistance are hardly displayed. Furthermore, since styrene is not sufficiently absorbed into an inside of the polyethylene-based resin component and is polymerized alone, a large amount of polymer powder is generated.

Especially, conventional methods have difficulty in producing the expandable resin particles uniformly containing not less than 300 parts by weight of the polystyrene-based resin component, whereas the present invention can easily produce them.

As the volatile blowing agent, for example, a hydrocarbon such as propane, butane, isobutene, pentane, isopentane, cyclopentane, and hexane may be used alone, or two or more types of these hydrocarbons may be used in combination.

A content of the blowing agent is preferably 5 to 10 parts by weight relative to 100 parts by weight of the resin component (an amount of the polyethylene-based resin component and the polystyrene-based resin component in total) which constitute the expandable resin particles.

In the present invention, less than 2 wt % of the gel component (a gel fraction) comprising the graft polymer of the polyethylene-based resin component and the polystyrene-based resin component is contained in the base resin of the expandable resin particles. A criterion for judging whether or not the gel component is a graft polymer is the presence or absence of polystyrene in the gel component. In the present invention, the gel component containing 10 wt % or more of polystyrene is defined as the graft polymer. A method for determining a polystyrene content in the gel component is described in Examples.

The gel fraction within the above-mentioned range facilitates recycled use of the expanded molded product and allows for production of the expandable resin particles which provide the expanded molded product excellent in physical properties including impact resistance.

A gel fraction of 2 wt % or more is not preferable because where a resin is subjected to melt-kneading by an extruder for recycled use of the expanded molded article, the unmelted gel component forms a granular structure and thus a strand of resin extruded from the extruder is improperly cut immediately after it is extruded, rendering difficult the recycled use of the foamed molded article. The gel fraction more preferably is 1.8 wt % or less. The strand of resin extruded from the extruder is normally cut into particles to be recycled.

Preferably, the expandable resin particles each have a substantially spherical shape or a cylindrical shape having an L/D (where L is a length of each particle and D is a diameter of each particle) of 0.6 to 1.6, and an average particle size of 0.3 to 2.0 mm.

The 0 having a high ovality such that the L/D is not more than 0.6 and not less than 1.6 are not preferable since the expandable resin particles have poor mold fillability when they are pre-expanded as expandable styrene-modified resin particles and filled into a mold to obtain the expanded molded article. The shape of the expandable resin particles preferably is substantially spherical to improve the mold fillability.

The average particle size of less than 0.3 mm is not preferable because a retention of the blowing agent decreases and a reduction of density of the formed molded article is difficult. The average particle size of more than 2.0 mm is also not preferable since not only do the particles have poor mold fillability, but also thinning of the formed molded article is difficult.

A production method for the expandable resin particles of the invention will hereinafter be described.

Firstly, 100 parts by weight of the polyethylene-based resin particles, 50 to 1000 parts by weight of the styrene-based monomer, 0.1 to 0.9 parts by weight of the polymerization initiator relative to 100 parts by weight of the styrene-based monomer are dispersed in the suspension containing the dispersant.

Preferably, the polyethylene-based resin particles used in the method each have the substantially spherical shape or the cylindrical shape having an L/D (where L is a length of each particle and D is a diameter of each particle) of 0.6 to 1.6, and preferably have an average particle size of 0.2 to 1.5 mm. The polyethylene-based resin particles having a high ovality such that the L/D is not more than 0.6 and not less than 1.6 are not preferable since the polyethylene-based resin particles have poor mold fillability when they are pre-expanded as the expandable styrene-modified resin particles and filled into a mold to obtain the expanded molded article. The shape of the polyethylene-based resin particles preferably is substantially spherical to improve mold fillability. The average particle size of less than 0.2 mm is not preferable since a retention of the blowing agent decreases and a reduction of the density of the expanded molded article is difficult. The average particle size of more than 1.5 mm is also not preferable because not only do the particles have poor mold fillability, but also thinning of the expanded molded article is difficult.

Examples of an aqueous medium which is a component of the suspension include water and a mixed medium of water and an aqueous solvent (e.g., a lower alcohol).

A dispersant is not particularly limited and any conventional dispersant may be used. Specifically, the dispersant may be practically insoluble inorganic substances such as calcium phosphate, magnesium pyrophosphate, sodium pyrophosphate, and magnesium oxide.

A polymerization initiator may be one that is generally used as a suspension polymerization initiator of the styrene-based monomer. Examples thereof include organic peroxides such as benzoyl peroxide, t-butyl peroxide, t-butyl peroxybenzoate, dicumyl peroxide, 2,5-dimethyl-2,5-di-t-butyl peroxyhexane, t-butylperoxy-3,5,5-trimethylhexanoate, and t-butyl-peroxy-2-ethylhexyl carbonate. These polymerization initiators may be used alone, or two or more types of these polymerization initiators may be used in combination.

An amount of the polymerization initiator is preferably 0.1 to 0.9 parts by weight, and more preferably 0.2 to 0.5 parts by weight relative to 100 parts by weight of the styrene-based monomer. The polymerization initiator in an amount of less than 0.1 parts by weight is not preferable since styrene is not smoothly polymerized, and thereby polystyrene and polyethylene are not homogeneously mixed in the resin particles and a larger amount of polymer powder is generated. Use of the polymerization initiator in an amount of more than 0.9 parts by weight decreases a molecular weight of the polystyrene-based resin.

A molecular weight of polystyrene-based resin component is preferably about 200,000 to 400,000 to achieve fine physical properties. The polymerization initiator in an amount of more than 0.9 parts by weight can only achieve a styrene molecular weight less than the above range.

The amount of the styrene-based monomer added in the suspension is 50 to 1000 parts by weight relative to 100 parts by weight of the polyethylene-based resin particles.

Next, the resultant dispersion is heated to such a temperature that polymerization of the styrene-based monomer does not substantially take place to impregnate the styrene-based monomer into the polyethylene-based resin particles.

An appropriate time required for impregnating the styrene-based monomer into the inside of the polyethylene-based resin particles is 30 minutes to 2 hours, since when the polymerization proceeds before the styrene-based monomer is sufficiently impregnated into the resin particles, the polymer powder of polystyrene is generated. The temperature at which the styrene-based monomer is substantially not polymerized should be higher to accelerate an impregnation rate, but the temperature needs to be determined in due consideration of a decomposition temperature of the polymerization initiator.

Subsequently, the polymerization of the styrene-based monomer is carried out at a temperature of (T−15) to (T−8)° C. or (T+1) to (T+5)° C. (where T° C. is the melting point of the above-mentioned polyethylene-based resin particles).

The polymerization temperature of lower than (T−15)° C. is not preferable because a crystallized moiety of polyethylene is not sufficiently melted and the styrene-based monomer is not uniformly polymerized in the inside of the polyethylene-based resin particles. The polymerization at a temperature in a range of higher than (T−8)° C. and lower than (T+1)° C. is not preferable since a gel fraction of resultant expandable resin particles exceeds 2 wt %.

Furthermore, there may be a case where the gel fraction exceeds 40 wt % depending on the type and amount of the polymerization initiator and the polymerization temperature. The above-mentioned temperature range is a little lower than the melting point of the polyethylene-based resin particles, and crystals hardly exist at this temperature. However, since a polymer chain is not in free state, it is presumed that the styrene-based monomer is more likely to be graft-polymerized on the polyethylene chain.

In addition to the above, at a temperature of more than (T+5)° C., an internal pressure of a polymerization reactor is increased, causing not only the addition of the styrene-based monomer to be difficult but also the gel component to be generated. It is presumed that, at such a high temperature, abstraction of a hydrogen atom from the polyethylene chain is more likely to occur and thus graft polymerization readily proceeds.

Lastly, the volatile blowing agent is impregnated into the resin particles during or after the polymerization so that the expandable resin particles are obtained. This impregnation of the blowing agent can be performed by a per se known method. For example, the impregnation during polymerization can be carried out by conducting the polymerization in a closed vessel, and by injecting the volatile blowing agent into the vessel. The impregnation after the polymerization is carried out by injecting the volatile blowing agent into a closed vessel. In the impregnation after the polymerization, a vessel for the polymerization may not be a closed vessel as long as the impregnation is carried out in the closed vessel.

The above-mentioned method provides the expandable resin particles having excellent characteristics. However, where the amount of the styrene-based monomer to be added exceeds 300 parts by weight relative to 100 parts by weight of the polyethylene-based resin particles, the amount of the polymer powder of polystyrene tends to increase.

More specifically, in the above-mentioned method, where the amount of the styrene-based monomer is 50 to 300 parts by weight relative to 100 parts by weight of the polyethylene-based resin particles, only a small amount of polymer powder of polystyrene is generated and the expandable resin particles having the most stable and excellent characteristics are readily obtained.

Where the amount of the styrene-based monomer exceeds 300 parts by weight, it is preferable that the styrene-based monomer is impregnated into the polyethylene-based resin particles in two separate steps as described below to minimize the generation of the polymer powder.

Firstly, 100 parts by weight of polyethylene-based resin particles, 30 to 300 parts by weight of a styrene-based monomer, and 0.1 to 0.9 parts by weight of a polymerization initiator relative to 100 parts by weight of the styrene-based monomer are dispersed in a suspension containing a dispersant.

Then, a dispersion thus obtained is heated at such a temperature that polymerization of the styrene-based monomer does not substantially take place to impregnate the styrene-based monomer into the polyethylene-based resin particles.

Subsequently, a first polymerization of the styrene-based monomer is performed at a temperature of (T−15) to (T−8)° C. or (T+1) to (T+5)° C. (where T° C. is a melting point of the polyethylene-based resin particles).

In turn, when a conversion ratio of polymerization reaches to 80 to 99.9%, a styrene-based monomer and 0.1 to 0.9 parts by weight of a polymerization initiator relative to 100 parts by weight of the styrene-based monomer are added, and impregnation of the styrene-based monomer into the low-density polyethylene-based resin particles and a second polymerization of the styrene-based monomer are performed at a temperature of (T−15) to (T−8)° C. or (T+1) to (T+5)° C. (where T ° C. is the melting point of the polyethylene-based resin particles). The amount of the styrene-based monomer used in the first and second polymerization in total is 50 to 1000 parts by weight relative to 100 parts by weight of the polyethylene-based resin particles.

Where more than 300 parts by weight of the styrene-based monomer is added when the conversion ratio of polymerization reaches to 80%, the styrene-based monomer is quickly impregnated into the polyethylene-based resin particles for quick polymerization of the styrene-based monomer, whereby the generation of the polymer powder of polystyrene can be suppressed. When the conversion ratio of polymerization exceeds 99.9%, the impregnation of the styrene-based monomer added is difficult and a conversion ratio decreases, causing the generation of the powdered particles difficult to be suppressed.

A mixed solution containing the styrene-based monomer and the polymerization initiator may be added continuously or intermittently for the second polymerization. To prevent the generation of the polymer powder, the impregnation into the inside of the polyethylene-based resin particles and the polymerization are preferably performed at almost the same time. A fast addition rate is not preferable because the fast addition rate in combination with a relatively high polymerization temperature causes the polymerization to occur before the resin particles are impregnated. An extremely slow addition rate is not preferable since it may hinder the polymerization. For example, the addition rate for 300 to 1000 parts by weight of the styrene-based monomer is 3 to 5 hours.

Lastly, a volatile blowing agent is impregnated into the resin particles during or after the polymerization in the same manner as in the above-mentioned production method, so that expandable resin particles are obtained.

The expandable resin particles of the present invention thus obtained may serve as pre-expanded particles by pre-expanding the expandable resin particles to a predetermined bulk density (e.g., 20 to 200 kg/m$^3$) by a conventional method. A method for determining the bulk density will be described in Examples.

Furthermore, an expanded molded article is provided by filling the pre-expanded particles into a mold and heating the pre-expanded particles again to allow them to fuse together by heat while expansion.

As a medium for heating the pre-expanded particles, steams are suitably used. A density of the expanded molded article is preferably 20 to 200 kg/m$^3$. The expanded molded article having a density of less than 20 kg/m$^3$ is not preferable since sufficient strength is not achieved. The expanded molded article having a density of more than 200 kg/m$^3$ is also not preferable since reduction in weight can not be achieved and the expanded molded article may not be able to sufficiently exert characteristics of polyethylene including resilience.

The expanded molded article thus obtained is tough and excellent in impact strength. Furthermore, the expanded molded article has high stiffness due to the modification of styrene.

A falling ball impact value of the expanded molded article is preferably 60 cm or more. The expanded molded article having a falling ball impact value of less than 60 cm may be used, but if the expanded molded article has a falling ball impact value of not less than 60 cm, it is not easily chipped or broken and thus applicable to shipping containers. The falling ball impact value of the expanded molded article is more preferably 70 cm or more. A method for measuring the falling ball impact value will be described in Examples.

The expanded molded article of the present invention may be used for various purposes, and particularly suitable for material for interior furnishings of a car, energy absorbing material to be inserted inside a bumper, packing material for heavy products, and the like.

EXAMPLES

The present invention will hereunder be described with reference to Examples and Comparative Examples, but it should be understood that the invention be not limited by these Examples and Comparative Examples. Methods for determining values shown in Examples and Comparative Examples are described below.

(Measurement of Powder Content)

For measurement of a powder content, about 1000 g of a polymerized slurry sample was introduced into a polymer beaker having a water vent with 35-mesh wire gauze attached on its top. Into this beaker about 6 liter of wash water was gradually introduced, and liquid flowed out of the vent was collected. The collected liquid was filtered by a glass fiber paper filter (GA-100) and dried in an oven at 60° C. for 3 hours to measure the weight of dried polymer powder. The resin remained in the slurry sample after washing was dried and weighed as well. The powder content was determined by the following equation:

$$\frac{\text{Weight of powder resin (g)}}{\text{Weight of dried resin (g)}} \times 100 = \text{powder content (wt \%)}$$

(Determination of Gel Fraction)

For determination of a gel fraction, a sample of resin particles was weighed, the sample was put in a flask, and 100 ml of toluene was added. The particles were then dissolved in [[a ]] an oil bath at 130° C. for 24 hours. After the flask was taken out from the oil bath, a resultant mixture was immediately filtered by a 80-mesh ($\phi$ 0.12 mm) wire gauze, and a sample remaining on the wire gauze which is insoluble in boiling toluene and the wire gauze was then allowed to stand in an oven at 130° C. for an hour to remove toluene, and a weight of the resultant solid was measured. The gel fraction is determined by the following equation:

$$\frac{\text{Weight of resultant solid}}{\text{Weight of sample}} \times 100 = \text{gel fraction (wt \%)}$$

About 200 µg of the resultant solid was weighed and enwrapped in a ferromagnetic metal (Pyrofoil: manufactured by Japan Analytical Industry Co., Ltd.) so as to be in close contact with each other. Then, a pyrolysate was generated using a pyrolysis apparatus called Curie Point Pyrolyzer Model JHP-3 (manufactured by Japan Analytical Industry Co., Ltd.). The pyrolysate was analyzed using Gas Chromatograph Auto System (manufactured by Perkin Elmer) to determine an polystyrene content from the analytical result. The following analytical conditions were adopted. Pyrolysis temperature: 590° C.-5 sets, oven temperature: 280° C., needle temperature: 300° C., column: DB-5 (0.25 µm×$\phi$ 0.25 mm×30 m, manufactured by J & W), column temperature: 50° C. (1 min)→temperature rise of 10° C./min→100° C.→temperature rise of 40° C./min→320° C. (3.5 min), carrier gas: He, carrier flow rate: 1 ml/min, pressure at column inlet: 12 psi, temperature at column inlet: 300° C., temperature of a detector: 300° C., and detector: FID. Determination was made by an absolute calibration curve method using polystyrene resin QC254 manufactured by Asahi Kasei Co., as a standard sample.

When the polystyrene content is 10 wt % or more, it was determined that a gel component comprises a graft polymer but not a cross-linked polymer.

(Measurement of Molecular Weight of Polystyrene Resin Component in Resin Particles)

An average molecular weight (Mw) of a polymer was measured by GPC (Gel Permeation Chromatography) under the following conditions.

Measuring Equipment:
  High-speed GPC equipment HLC-8020 manufactured by Tosoh Corp.

Column:
  HSG-60S×2, HSG-40H×1, HSG-20H×1 manufactured by Sekisui Fine Chemicals Co., Ltd.

Measuring Conditions:
  Column temperature: 40° C.
  Moving bed: THF (tetrahydrofuran)
  Flow rate: 1.0 ml/min
  Injection amount: 500 ml
  Detector: RID-6A
    manufactured by Tosoh Corp.
  Molecular weight determination of the sample:

For measuring a molecular weight of a sample, conditions for measuring were selected so that a molecular weight distribution of the sample overlaps a range of a linear calibration curve correlating a count number with a logarithm of the molecular weight of various monodisperse polystyrene standard samples. In the present invention, the calibration curve for polystyrene was plotted using six polystyrene standard samples (TSK standard polystyrene) respectively having a weight-average molecular weight of $2.74 \times 10^3$, $1.91 \times 10^4$, $1.02 \times 10^5$, $3.55 \times 10^5$, $2.89 \times 10^6$, $4.48 \times 10^6$ manufactured by Tosoh Corp.

(Determination of Bulk Density)

A bulk density was determined according to a method described in JIS K 6911:1955 "General Testing Methods for Thermosetting Plastics". Specifically, pre-expanded particles free-falling into a graduated cylinder by an apparent density measuring instrument was weighed to determine their bulk density by the following equation.

bulk density (kg/m$^3$)=weight (kg)/particle volume in the graduated cylinder (m$^3$)

(Determination of Density of Expanded Molded Article)

A density of an expanded molded article was determined according a method described in JIS A 9511:1995 "Preformed Cellular Plastics Thermal Insulation Materials".

(Measurement of Impact Strength)

For measurement of impact strength, an expanded molded article was cut to form a sample having a size of 215×40×20 mm, and the sample was then placed on a pair of holding members arranged at a distance of 155 mm. A steel ball weighing 321 g was added on the middle of the sample in width direction thereof at a position halfway between the pair of holding members to see whether or not the sample was crushed.

The test was repeated at different heights of drop and the minimum height of drop that produced crush on the sample was defined as a falling ball impact value to evaluate the impact strength. Thus, the impact strength increases as the falling ball impact value increases.

(Measurement of Compressive Strength)

A compressive strength was measured according to a method described in JIS A 9511:1995 "Preformed Cellular Plastics Thermal Insulation Materials". In other words, the compressive strength of a test specimen having a size of 50×50×50 mm was measured when it was compressed by 5% using a universal testing machine Tensilon UCT-10T (manufactured by Orientech Co., Ltd.) under a compressive rate of 10 mm/min.

(Evaluation of Recyclability)

A recyclability was evaluated by extruding styrene-modified polyethylene-based resin particles and an expanded molded article using an extruder (compression kneading uniaxial extruder: CER-40 manufactured by Hoshi Plastic Co., Ltd., perforated plate: φ 2 mm×1 perforation). The number of times strands are cut in an hour was counted. When the strands were cut 5 times or more in an hour, a cross (X) was marked, and when the strands were cut less than 5 times in an hour, a circle (○) was marked. The result of the evaluation was that the X was marked when a gel fraction was not less than 2 wt %, and the ○ was marked when the gel fraction was less than 2 wt %.

Example 1

Production of Polyethylene-Based Resin Particles

Linear low-density polyethylene (ethylene-hexene copolymer, melt index of 1.0 g/10 min, density of 0.921 g/ml, melting point of 126° C.) was granulated by an extruder to obtain polyethylene-based resin particles of substantially spherical shape having an L/D of 0.9 and an average particle size of 0.8 mm. As a foam regulator, 0.5 parts by weight of talc relative to 100 parts by weight of the above-mentioned polyethylene was added at the granulation.

(Production of Styrene-Modified Polyethylene-Based Resin Particles)

40 kg of pure water, 200 g of magnesium pyrophosphate as a dispersant, 20 g of sodium dodecylbenzenesulfonate were introduced in an autoclave having an internal volume of 100 liter to prepare an aqueous medium. 14 kg of the above-mentioned polyethylene-based resin particles was suspended in the aqueous medium and stirred at 150 rpm.

Into the autoclave, a mixed solution containing 26 kg of a styrene monomer (185 parts by weight relative to 100 parts by weight of polyethylene) and 78 g of t-butylperoxybenzoate (TBPB) (0.3 parts by weight relative to 100 parts by weight of the styrene monomer) as a polymerization initiator was added and allowed to stand at 60° C. for 60 minutes to impregnate the styrene monomer into the polyethylene-based resin particles.

Then, the temperature was raised to 117° C. and polymerization was performed for 4 hours. Further, by raising to 140° C. and maintained for 2 hours, the remaining monomer was forcibly polymerized to reduce its amount, and then the autoclave was cooled to take out styrene-modified polyethylene-based resin particles. The powder content in the polymerized slurry was 0.3 wt %, and the gel fraction of the resin particles obtained was 0.3 wt %. The polystyrene content in the gel component was 23.3 wt %, and the molecular weight of the polystyrene resin component was about 320,000.

(Production of Expandable Particles of Styrene-Modified Polyethylene-Based Resin and Evaluations of their Expandability and Moldability)

20 kg of the above-mentioned styrene-modified polyethylene-based resin particles and 400 g of toluene were introduced into a pressure-resistant twin-cylinder mixer which has an internal volume of 50 liter and can be hermetically sealed. After the mixer was hermetically sealed, it was rotated and 2800 g of butane (n-butane: i-butane=7:3, volume ratio, butane with the same volume ratio was used in the following Examples) was forced into the mixer. Then, the temperature was raised to 70° C. and maintained for 4 hours to impregnate butane into the particles. The mixer was then cooled and expandable particles of a styrene-modified polyethylene-based resin were taken out.

The expandable resin particles taken out from the mixer were immediately pre-expanded by steam to have a bulk density of 33 kg/m$^3$. About 24 hours later, the pre-expanded resin particles were filled into a mold and heated by steam to allow them to fuse together by heat while being expanded, so that an expanded molded article having a density of 33 kg/m$^3$ are obtained. The expanded molded article thus obtained had excellent strength, showing a falling ball impact value as high as 80 cm. The compressive strength was 34 N/cm$^2$.

Example 2

40 kg of pure water, 200 g of magnesium pyrophosphate as a dispersant, 20 g of sodium dodecylbenzenesulfonate were introduced in an autoclave having an internal volume of 100 liter to prepare an aqueous medium. 6 kg of the polyethylene-based resin particles obtained in Example 1 was suspended in the aqueous medium and stirred at 150 rpm.

Into the autoclave, a mixed solution containing 12 kg of a styrene monomer (200 parts by weight relative to 100 parts by weight of polyethylene) and 36 g of t-butylperoxy-2-ethylhexylcarbonate (TBPOEHC) (0.3 parts by weight relative to 100 parts by weight of the styrene monomer) as a polymerization initiator was added and allowed to stand at 60° C. for 60 minutes to impregnate the styrene monomer into the polyethylene-based resin particles.

Then, the temperature was raised to 115° C. and polymerization was performed for 3 hours. After a conversion ratio of polymerization of the styrene monomer reached to 85%, a mixed solution containing 22 kg of a styrene monomer (366 parts by weight relative to 100 parts by weight of polyethylene) and 66 g of TBPOEHC (0.3 parts by weight relative to 100 parts by weight of the styrene monomer) as a polymerization initiator was added at 115° C. over a period of 4 hours to perform polymerization while impregnating the styrene monomer into the inside of polyethylene. Then, by raising to 140° C. and maintained for 2 hours, the remaining monomer was forcibly polymerized to reduce its amount, and then the autoclave was cooled to take out styrene-modified polyethylene-based resin particles.

The powder content in the polymerized slurry was 0.7 wt %, and the gel fraction of the resin particles obtained was 0.9 wt %. The polystyrene content in the gel component was 22.2 wt %, and the molecular weight of the polystyrene resin component was about 320,000. The expandable resin particles taken out from the mixer were immediately pre-expanded by steam to have a bulk density of 33 kg/m$^3$ as in Example 1. As in Example 1, the pre-expanded resin particles was expanded and molded to obtain an expanded molded article. The expanded molded article had a density of 33 kg/m$^3$ and was excellent in strength, showing a falling ball impact value as high as 70 cm. The compressive strength was 42 N/cm$^2$.

Example 3

The same polymerization procedure as in Example 1 was repeated except that the amounts of the polyethylene-based resin particles, styrene monomer and TBPB were 20 kg, 20 kg (100 parts by weight relative to 100 parts by weight of polyethylene) and 60 g (0.3 parts by weight relative to 100 parts by weight of the styrene monomer), respectively, and that the temperature for polymerization was 115° C., to obtain styrene-modified polyethylene-based resin particles, a pre-expanded resin particles and an expanded molded article thereof.

The powder content in the polymerized slurry was 0.3 wt %, and the gel fraction of the resin particles obtained was 0.6 wt %. The polystyrene content in the gel component was 25.0 wt %, and the molecular weight of the polystyrene resin component was about 300,000. The pre-expanded resin particles had a bulk density of 33 kg/m$^3$. The expanded molded article obtained had a density of 33 kg/m$^3$ and was excellent in strength, showing a falling ball impact value as high as 90 cm. The compressive strength was 30 N/cm$^2$.

Example 4

The same polymerization procedure as in Example 1 was repeated except that dicumyl peroxide (DCP) was adopted as the polymerization initiator and that the temperature for polymerization was 130° C., to obtain styrene-modified polyethylene-based resin particles, pre-expanded resin particles and an expanded molded article thereof.

The powder content in the polymerized slurry was 0.6 wt %, and the gel fraction of the resin particles obtained was 0.8 wt %. The polystyrene content in the gel component was 18.7 wt %, and the molecular weight of a polystyrene resin component was about 270,000. The pre-expanded resin particles had a bulk density of 33 kg/m$^3$. The expanded molded article obtained had a density of 33 kg/m$^3$ and was excellent in strength, showing a falling ball impact value as high as 85 cm. The compressive strength was 35 N/cm$^2$.

Example 5

The same polymerization procedure as in Example 1 was repeated except that 156 g of t-butylperoxy-3,5,5-trimethyl-hexanoate (TBPOTMH) (0.6 parts by weight relative to 100 parts by weight of the styrene monomer) was adopted as the polymerization initiator, to obtain styrene-modified polyethylene-based resin particles, pre-expanded resin particles and an expanded molded article thereof.

The powder content in the polymerized slurry was 0.3 wt %, and the gel fraction of the resin particles obtained was 0.4 wt %. The polystyrene content in the gel component was 25.0 wt %, and the molecular weight of the polystyrene resin component was about 250,000. The pre-expanded resin particles had a bulk density of 33 kg/m$^3$. The expanded molded article obtained had a density of 33 kg/m$^3$ and was excellent in strength, showing a falling ball impact value as high as 80 cm. The compressive strength was 32 N/cm$^2$.

Example 6

The same polymerization procedure as in Example 1 was repeated except that the amounts of the polyethylene-based resin particles and styrene monomer were 11.5 kg and 28.5 kg (250 parts by weight relative to 100 parts by weight of polyethylene), respectively, to obtain styrene-modified polyethylene-based resin particles, pre-expanded resin particles and an expanded molded article thereof.

The powder content in the polymerized slurry was 0.8 wt %, and the gel fraction of the resin particles obtained was 0.7 wt %. The polystyrene content in the gel component was 15.7 wt %, and the molecular weight of the polystyrene resin component was about 320,000. The pre-expanded resin particles had a bulk density of 33 kg/m$^3$. The expanded molded article obtained had a density of 33 kg/m$^3$ and was excellent in strength, showing a falling ball impact value as high as 80 cm. The compressive strength was 36 N/cm$^2$.

Example 7

40 kg of pure water, 200 g of magnesium pyrophosphate as a dispersant, 20 g of sodium dodecylbenzenesulfonate were introduced in an autoclave having an internal volume of 100 liter to prepare an aqueous medium. 10 kg of the polyethylene-based resin particles obtained in Example 1 was suspended in the aqueous medium and stirred at 150 rpm.

Into the autoclave, a mixed solution containing 4 kg of a styrene monomer (40 parts by weight relative to 100 parts by weight of polyethylene) and 12 g of DCP (0.3 parts by weight relative to 100 parts by weight of the styrene monomer) as a polymerization initiator was added and allowed to stand at 60° C. for 60 minutes to impregnate the styrene monomer into the polyethylene-based resin particles.

Then, the temperature was raised to 130° C. and polymerization was performed for 3 hours. After a conversion ratio of polymerization of the styrene monomer reached to 90%, a mixed solution containing 26 kg of a styrene monomer (260 parts by weight relative to 100 parts by weight of polyethylene) and 78 g of TBPOEHC (0.3 parts by weight relative to 100 parts by weight of the styrene monomer) as a polymerization initiator was added at 115° C. over a period of 4 hours to perform polymerization while impregnating styrene into the inside of polyethylene. Then, by raising to 140° C. and maintained for 2 hours, the remaining monomer was forcibly polymerized to reduce its amount, and then the autoclave was cooled to obtain styrene-modified polyethylene-based resin particles. Also, as in Example 1, pre-expanded resin particles and an expanded molded article were obtained.

The powder content in the polymerized slurry was 0.6 wt %, and the gel fraction of the resin particles obtained was 0.5 wt %. The polystyrene content in the gel component was 16.0 wt %, and the molecular weight of the polystyrene resin component was about 320,000. The pre-expanded resin particles had a bulk density of 33 kg/m$^3$. The expanded molded article obtained in the same manner as in Example 1 had a density of 33 kg/m$^3$ and was excellent in strength, showing a falling ball impact value as high as 75 cm. The compressive strength was 38 N/cm².

Example 8

40 kg of pure water, 200 g of magnesium pyrophosphate as a dispersant, 20 g of sodium dodecylbenzenesulfonate were introduced in an autoclave having an internal volume of 100 liter to prepare an aqueous medium. 4.4 kg of the polyethylene-based resin particles obtained in Example 1 was suspended in the aqueous medium and stirred at 150 rpm.

Into the autoclave, a mixed solution containing 4.4 kg of a styrene monomer (100 parts by weight relative to 100 parts by weight of polyethylene) and 13.2 g of DCP (0.3 parts by weight relative to 100 parts by weight of the styrene monomer) as a polymerization initiator was added and allowed to stand at 60° C. for 60 minutes to impregnate the styrene monomer into the polyethylene-based resin particles.

Then, the temperature was raised to 130° C. and polymerization was performed for 3 hours. After a conversion ratio of polymerization of the styrene monomer reached to 90%, a mixed solution containing 31.2 kg of a styrene monomer (700 parts by weight relative to 100 parts by weight of polyethylene) and 93.6 g of TBPOEHC (0.3 parts by weight relative to 100 parts by weight of the styrene monomer) as a polymerization initiator was added at 115° C. over a period of 5 hours to perform polymerization while impregnating styrene into the inside of polyethylene. Then, by raising to 140° C. and maintained for 2 hours, the remaining monomer was forcibly polymerized to reduce its amount, and then the autoclave was cooled to obtain styrene-modified polyethylene-based resin particles. Also, as in Example 1, pre-expanded resin particles and an expanded molded article were obtained.

The powder content in the polymerized slurry was 0.9 wt %, and the gel fraction of the resin particles obtained was 0.8 wt %. The polystyrene content in the gel component was 15.0 wt %, and the molecular weight of the polystyrene resin component was about 320,000. The pre-expanded resin particles had a bulk density of 33 kg/m³. The expanded molded article obtained in the same manner as in Example 1 had a density of 33 kg/m³ and was excellent in strength, showing a falling ball impact value as high as 65 cm. The compressive strength was 45 N/cm².

Example 9

40 kg of pure water, 200 g of magnesium pyrophosphate as a dispersant, 20 g of sodium dodecylbenzenesulfonate were introduced in an autoclave having an internal volume of 100 liter to prepare an aqueous medium. 14 kg of the polyethylene-based resin particles obtained in Example 1 was suspended in the aqueous medium and stirred at 150 rpm.

Into the autoclave, a mixed solution containing 5.6 kg of a styrene monomer (40 parts by weight relative to 100 parts by weight of polyethylene) and 13.4 g of DCP (0.24 parts by weight relative to 100 parts by weight of the styrene monomer) as a polymerization initiator was added and allowed to stand at 60° C. for 60 minutes to impregnate the styrene monomer into the polyethylene-based resin particles.

Then, the temperature was raised to 130° C. and polymerization was performed for 3 hours. After a conversion ratio of polymerization of the styrene monomer reached to 90%, a mixed solution containing 20.4 kg of a styrene monomer (145 parts by weight relative to 100 parts by weight of polyethylene) and 49 g of TBPOEHC (0.24 parts by weight relative to 100 parts by weight of the styrene monomer) as a polymerization initiator was added at 117° C. over a period of 4 hours to perform polymerization while impregnating styrene into the inside of polyethylene. Then, by raising to 140° C. and maintained for 2 hours, the remaining monomer was forcibly polymerized to reduce its amount, and then the autoclave was cooled to obtain styrene-modified polyethylene-based resin particles. Also, as in Example 1, pre-expanded resin particles and an expanded molded article were obtained.

The powder content in the polymerized slurry was 0.2 wt %, and the gel fraction of the resin particles obtained was 0.3 wt %. The polystyrene content in the gel component was 16.6 wt %, and the molecular weight of the polystyrene resin component was about 320,000. The pre-expanded resin particles and expanded molded article obtained in the same manner as in Example 1 had a bulk density of 33 kg/m³ and a density of 33 kg/m³, respectively, and were excellent in strength, showing a falling ball impact value as high as 80 cm. The compressive strength was 35 N/cm².

Comparative Example 1

The same polymerization procedure as in Example 1 was repeated except that the amounts of the polyethylene-based resin particles and styrene monomer were 31 kg and 9 kg (30 parts by weight relative to 100 parts by weight of polyethylene), respectively, and that 27 g of TBPOTMH was adopted as the polymerization initiator, to obtain styrene-modified polyethylene-based resin particles.

The powder content in the polymerized slurry was 0.6 wt %, and the gel fraction of the resin particles obtained was 2.1 wt %. The polystyrene content in the gel component was 23.8 wt %. The same procedure as in Example 1 was repeated to obtain pre-expanded resin particles and an expanded molded article, but due to poor retention of gas, the pre-expanded resin particles having a bulk density of 33 kg/m³ and the expanded molded article having a density of 33 kg/m³ could not be obtained.

Comparative Example 2

The same polymerization procedure as in Example 1 was repeated except that the temperature for polymerization was 119° C., to obtain styrene-modified polyethylene-based resin particles, pre-expanded resin particles and an expanded molded article. The powder content in the polymerized slurry was 0.7 wt %, and the gel fraction of the resin particles was 6.5 wt %. The polystyrene content in the gel component was 21.5 wt %, and the molecular weight of the polystyrene resin component was about 270,000. The pre-expanded resin particles had a bulk density of 33 kg/m³. An expanded molded article obtained had a density of 33 kg/m³ and was excellent in strength, showing a falling ball impact value as high as 90 cm. However, due to the high gel fraction of the resin particles, recycled use of the expanded molded article was difficult. The compressive strength was 38 N/cm².

Comparative Example 3

The same polymerization procedure as in Example 1 was repeated except that the temperature for polymerization was 121° C., to obtain styrene-modified polyethylene-based resin particles, pre-expanded resin particles and an expanded molded article. The powder content in the polymerized slurry was 0.8 wt %, and the gel fraction of the resin particles was 25.0 wt %. The polystyrene content in the gel component was 24.0 wt %, and the molecular weight of the polystyrene resin component was about 260,000. The pre-expanded resin particles had a bulk density of 33 kg/m³. The expanded molded article obtained had a density of 33 kg/m³ and was excellent in strength, showing a falling ball impact value as high as 100 cm. However, due to the high gel fraction of the resin particles, recycled use of the expanded molded article was difficult. The compressive strength was 40 N/cm².

Comparative Example 4

The same polymerization procedure as in Example 1 was repeated except that the temperature for polymerization was 122° C., to obtain styrene-modified polyethylene-based resin particles, pre-expanded resin particles and an expanded molded article. The powder content in the polymerized slurry was 0.7 wt %, and the gel fraction of the resin particles obtained was as high as 32.2 wt %. The polystyrene content in the gel component was 26.4 wt %, and the molecular weight of the polystyrene resin component was about 250,000. The pre-expanded resin particles had a bulk density of 33 kg/m³. An expanded molded article obtained had a density of 33 kg/m³ and was excellent in strength, showing a falling ball impact value as high as 100 cm. However, due to the high gel fraction of the resin particles, recycled use of the expanded molded article was difficult. The compressive strength was 42 N/cm².

Comparative Example 5

The same polymerization procedure as in Example 1 was repeated except that the temperature for polymerization was 123° C., to obtain styrene-modified polyethylene-based resin particles, pre-expanded resin particles and an expanded molded article. The powder content in the polymerized slurry was 0.6 wt %, and the gel fraction of the resin particles was 19.6 wt %. The polystyrene content in the gel component was 26.5 wt %, and the molecular weight of the polystyrene resin component was about 260,000. The pre-expanded resin particles had a bulk density of 33 kg/m³. The expanded molded article obtained had a density of 33 kg/m³ and was excellent in strength, showing a falling ball impact value as high as 95 cm. However, due to the high gel fraction of the resin particles, recycled use of the expanded molded article was difficult. The compressive strength was 40 N/cm².

Comparative Example 6

The same polymerization procedure as in Example 1 was repeated except that the temperature for polymerization was 125° C., to obtain styrene-modified polyethylene-based resin particles, pre-expanded resin particles and an expanded molded article. The powder content in the polymerized slurry was 0.5 wt %, and the gel fraction of the resin particles obtained was 4.6 wt %. The polystyrene content in the gel component was 23.9 wt %, and the molecular weight of the polystyrene resin component was about 260,000. The pre-expanded resin particles had a bulk density of 33 kg/m³. An expanded molded article obtained had a density of 33 kg/m³ and was excellent in strength, showing a falling ball impact value as high as 90 cm. However, due to the high gel fraction of the resin particles, recycled use of the expanded molded article was difficult. The compressive strength was 38 N/cm².

Comparative Example 7

The same polymerization procedure as in Example 1 was repeated except that the temperature for polymerization was 135° C., to obtain styrene-modified polyethylene-based resin particles, pre-expanded resin particles and an expanded molded article. The powder content in the polymerized slurry was 0.5 wt %, and the gel fraction of the resin particles was 5.2 wt %. The polystyrene content in the gel component was 25.0 wt %, and the molecular weight of the polystyrene resin component was about 220,000. The pre-expanded resin particles had a bulk density of 33 kg/m³. An expanded molded article obtained had a density of 33 kg/m³ and was excellent in strength, showing a falling ball impact value as high as 90 cm. However, due to the high gel fraction of the resin particles, recycled use of the expanded molded article was difficult. The compressive strength was 38 N/cm².

Comparative Example 8

The same polymerization procedure as in Comparative Example 2 was repeated except that the amount of the polymerization initiator was 312 g (1.2 parts by weight relative to 100 parts by weight of the styrene monomer), to obtain styrene-modified polyethylene-based resin particles, pre-expanded resin particles and an expanded molded article. The powder content in the polymerized slurry was 0.6 wt %, and the gel fraction of the resin particles was 4.5 wt %. The polystyrene content in the gel component was 22.2 wt %, and the molecular weight of the polystyrene resin component was as low as about 150,000, suggesting that the styrene monomer was not uniformly polymerized in polyethylene. The pre-expanded resin particles had a bulk density of 33 kg/m³. The expanded molded article obtained had a density of 33 kg/m³. The expanded molded article was poor in strength, showing a falling ball impact value of 35 cm, possibly due to the non-uniform polymerization of the styrene monomer in polyethylene. The compressive strength was 28 N/cm². Also, recycled use of the expanded molded article was difficult.

Comparative Example 9

The same polymerization procedure as in Comparative Example 8 was repeated except that the temperature for polymerization was 117° C., to obtain styrene-modified polyethylene-based resin particles, pre-expanded resin particles and an expanded molded article thereof. The powder content in the polymerized slurry was 0.6 wt %, and the gel fraction of the resin particles obtained was 0.9 wt %. The polystyrene content in the gel component was 17.7 wt %, and the molecular weight of the polystyrene resin component was about 160,000. The pre-expanded resin particles had a bulk density of 33 kg/m³. The expanded molded article obtained had a density of 33 kg/m³ and was poor in strength, showing a falling ball impact value as low as 40 cm. The compressive strength was 28 N/cm².

A relationship between materials and the polymerization conditions of Examples 1 to 9 and Comparative examples 1 to 9 is shown in Table 1. The powder content, gel fraction, polystyrene content, molecular weight of the polystyrene resin component, falling ball impact value, compressive strength, and recyclability are together shown in Table 2.

TABLE 1

| | PE/PS pbw Ratio | Conversion Ratio of Polymerization (%) | Polymerization Temperature (° C.) | Polymerization Initiator | Amount of Initiator (pbw) |
|---|---|---|---|---|---|
| Ex. 1 | 100/185 | — | 117 | TBPB | 0.3 |
| Ex. 2 | 100/566 | 85 | 115 | TBPOEHC | 0.3 |
| Ex. 3 | 100/100 | — | 115 | TBPB | 0.3 |
| Ex. 4 | 100/185 | — | 130 | DCP | 0.3 |
| Ex. 5 | 100/185 | — | 117 | TBPOTMH | 0.6 |
| Ex. 6 | 100/250 | — | 117 | TBPB | 0.3 |
| Ex. 7 | 100/300 | 90 | 130, 115 | DCP, TBPOEHC | 0.3, 0.3 |
| Ex. 8 | 100/800 | 90 | 130, 115 | DCP, TBPOEHC | 0.3, 0.3 |
| Ex. 9 | 100/185 | 90 | 130, 117 | DCP, TBPOEHC | 0.24, 0.24 |
| Comp. Ex. 1 | 100/30 | — | 117 | TBPOTMH | 0.3 |
| Comp. Ex. 2 | 100/185 | — | 119 | TBPB | 0.3 |
| Comp. Ex. 3 | 100/185 | — | 121 | TBPB | 0.3 |
| Comp. Ex. 4 | 100/185 | — | 122 | TBPB | 0.3 |
| Comp. Ex. 5 | 100/185 | — | 123 | TBPB | 0.3 |
| Comp. Ex. 6 | 100/185 | — | 125 | TBPB | 0.3 |
| Comp. Ex. 7 | 100/185 | — | 135 | TBPB | 0.3 |
| Comp. Ex. 8 | 100/185 | — | 119 | TBPB | 1.2 |
| Comp. Ex. 9 | 100/185 | — | 117 | TBPB | 1.2 |

TABLE 2

| | Powder Content (wt %) | Gel Fraction (wt %) | PS Content in Gel Component (wt %) | M.W. Ca. ($\times 10^4$) | Falling Ball Impact Value (cm) | Compressive Strength (N/cm$^2$) | Recyclability |
|---|---|---|---|---|---|---|---|
| Ex. 1 | 0.3 | 0.3 | 23.3 | 32 | 80 | 34 | ◯ |
| Ex. 2 | 0.7 | 0.9 | 22.2 | 32 | 70 | 42 | ◯ |
| Ex. 3 | 0.3 | 0.6 | 25.0 | 30 | 90 | 30 | ◯ |
| Ex. 4 | 0.6 | 0.8 | 18.7 | 27 | 85 | 35 | ◯ |
| Ex. 5 | 0.3 | 0.4 | 25.0 | 25 | 80 | 32 | ◯ |
| Ex. 6 | 0.8 | 0.7 | 15.7 | 32 | 80 | 36 | ◯ |
| Ex. 7 | 0.6 | 0.5 | 16.0 | 32 | 75 | 38 | ◯ |
| Ex. 8 | 0.9 | 0.8 | 15.0 | 32 | 65 | 45 | ◯ |
| Ex. 9 | 0.2 | 0.3 | 16.6 | 32 | 80 | 35 | ◯ |
| Comp. Ex. 1 | 0.6 | 2.1 | 23.8 | 30 | — | — | — |
| Comp. Ex. 2 | 0.7 | 6.5 | 21.5 | 27 | 90 | 38 | X |
| Comp. Ex. 3 | 0.8 | 25.0 | 24.0 | 26 | 100 | 40 | X |
| Comp. Ex. 4 | 0.7 | 32.2 | 26.4 | 25 | 100 | 42 | X |
| Comp. Ex. 5 | 0.6 | 19.6 | 26.5 | 26 | 95 | 40 | X |
| Comp. Ex. 6 | 0.5 | 4.6 | 23.9 | 26 | 90 | 38 | X |
| Comp. Ex. 7 | 0.5 | 5.2 | 25.0 | 22 | 90 | 38 | X |
| Comp. Ex. 8 | 0.6 | 4.5 | 22.2 | 15 | 35 | 28 | X |
| Comp. Ex. 9 | 0.6 | 0.9 | 17.7 | 16 | 40 | 28 | ◯ |

Example 10

Polyethylene-based resin particles were obtained in the same manner as in Example 1 except that linear low-density polyethylene (ethylene-butene copolymer: melt index of 0.7 g/10 min, density of 0.922 g/ml, melting point of 121° C.) different in melting point from that of Example 1 was used.

The same polymerization procedure as in Example 1 was repeated except that the above-mentioned polyethylene-based resin particles and TBPOTMH as the polymerization initiator were used and that the temperature for polymerization was 111° C., to obtain styrene-modified polyethylene-based resin particles.

The powder content in the polymerized slurry was 0.6 wt %, and the gel fraction of the resin particles obtained was 0.5 wt %. The polystyrene content in the gel component was 16.0 wt %, and the molecular weight of the polystyrene resin component was about 380,000. Pre-expanded resin particles and an expanded molded article obtained in the same manner as in Example 1 had a bulk density of 33 kg/m$^3$ and density of 33 kg/m$^3$, respectively, and were excellent in strength, showing a falling ball impact value as high as 80 cm and a compressive strength as high as 34 N/cm$^2$.

Example 11

Polyethylene-based resin beads were obtained in the same manner as in Example 1 except that linear low-density polyethylene (ethylene-butene copolymer: melt index of 0.7 g/10 min, density of 0.922 g/ml, melting point of 121° C.) having a different melting point from that used in Example 1 was used.

The same polymerization procedure as in Example 1 was repeated except that the above-mentioned polyethylene-based resin particles and DCP as the polymerization initiator were used and that the temperature for polymerization was 124° C., to obtain styrene-modified polyethylene-based resin particles.

The powder content in the polymerized slurry was 0.5 wt %, and the gel fraction of the resin particles obtained was 0.8 wt %. The polystyrene content in the gel component was 15.0 wt %, and the molecular weight of the polystyrene resin component was about 270,000. Pre-expanded resin particles and an expanded molded article obtained in the same manner as in Example 1 had a bulk density of 33 kg/m$^3$ and density of 33 kg/m$^3$, respectively, and were excellent in strength, showing a falling ball impact value as high as 85 cm and a compressive strength as high as 35 N/cm$_2$.

The polymerization conditions, powder content, gel fraction, polystyrene content, molecular weight of the polystyrene resin component, falling ball impact value, compressive strength and recyclability of Examples 10 and 11 are together shown in Table 3

TABLE 3

| Polymerization Temp. (° C.) | Polymerization Initiator | Amount of Initiator (pbw) | Powder Content (%) | Gel Fraction (%) | PS Content in Gel (wt %) | M.W. Ca. (×10$^4$) | Falling Ball Impact Value (cm) | Compressive Strength (N/cm$^2$) | Recyclability |
|---|---|---|---|---|---|---|---|---|---|
| 111 | TBPOTMH | 0.3 | 0.6 | 0.5 | 16.0 | 38 | 80 | 34 | ○ |
| 124 | DCP | 0.3 | 0.5 | 0.8 | 15.0 | 27 | 85 | 35 | ○ |

As seen in Table 3, it is understood that, even when the polyethylene-based resin having the different melting point is used, a smaller amount of gel component is generated as long as the polymerization temperature is in a range of the present invention.

Example 12

The same polymerization procedure as in Example 1 was repeated except that 183 parts by weight of a styrene monomer and 2 parts by weight of α-methyl styrene (α-MS) relative to 100 parts by weight of polyethylene were added, to obtain styrene-modified polyethylene-based resin particles, pre-expanded resin particles and an expanded molded article thereof.

The powder content in the polymerized slurry was 0.8 wt %, and the gel fraction of the resin particles obtained was 0.9 wt %. The polystyrene content in the gel component was 17.8 wt %, and the molecular weight of the polystyrene resin component was about 250,000. The pre-expanded resin particles and expanded molded article obtained in the same manner as in Example 1 had a bulk density of 33 kg/m$^3$ and density of 33 kg/m$^3$, respectively, and were excellent in strength, showing a falling ball impact value as high as 75 cm. The compressive strength was 32 N/cm$^2$.

A relationship between materials, the polymerization conditions, powder content, gel fraction, polystyrene content, molecular weight of the polystyrene resin component, falling ball impact value, compressive strength and recyclability of Example 12 is shown in Table 4.

TABLE 4

| PE/ PS/ α-MS | Polymerization Temp. (° C.) | Polymerization Initiator | Amount of Initiator (pbw) | Powder Content (%) | Gel Fraction (%) | PS Content In Gel (wt %) | M.W. Ca. (×10$^4$) | Falling Ball Impact Value (cm) | Compressive Strength (N/cm$^2$) | Recyclability |
|---|---|---|---|---|---|---|---|---|---|---|
| 100/183/2 | 117 | TBPB | 0.3 | 0.8 | 0.9 | 17.8 | 25 | 75 | 32 | ○ |

As seen in Table 4, it is understood that, even when a mixture of two different kinds of styrene monomers is used, a smaller amount of gel component is generated as long as the polymerization temperature is in a range of the present invention Example 13

Figure 1:
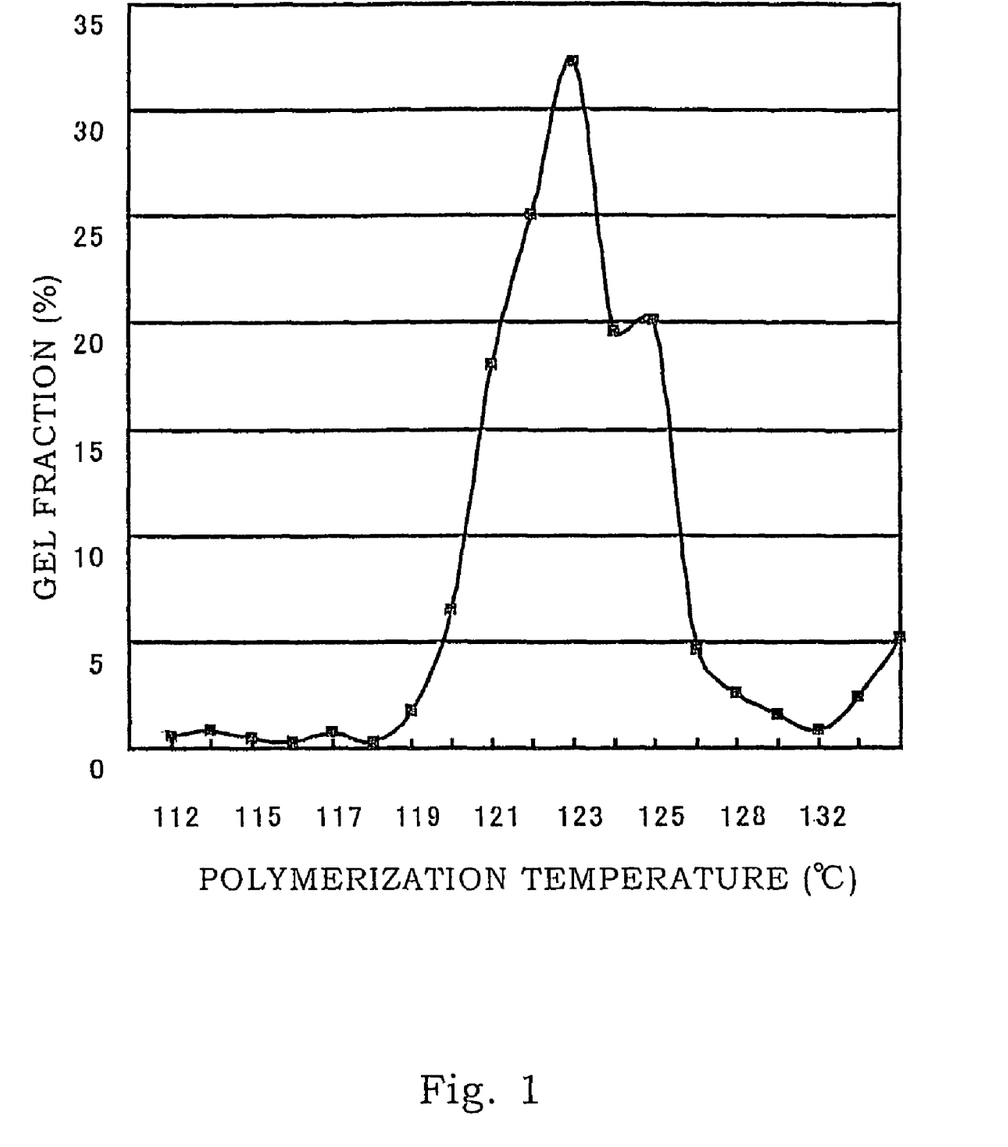
FIG. 1 is a graph showing a relationship between a polymerization temperature and a gel fraction.

Styrene-modified polyethylene-based resin particles, pre-expanded resin particles and an expanded molded article thereof were obtained in the same manner as in Example 1 except that different polymerization temperatures and initiators shown in Table 5 were adopted for studying a relationship between the polymerization temperature and the gel fraction. The polymerization temperature, type of the polymerization initiator, gel fraction, polystyrene content in the gel component, molecular weight of the polystyrene resin component, falling ball impact value, compressive strength and recyclability are together shown in Table 5. Also, the relationship between the polymerization temperature and the gel fraction is shown in FIG. 1.

specific temperature, thereby realizing uniform impregnation of the styrene-based monomer into the polyethylene-based resin particles and uniform polymerization of the styrene-based monomer. Consequently, the present invention provides the expandable resin particles which provide the expanded molded article excellent in physical properties and particularly having an excellent impact resistance. Further, the expanded molded article obtained by using the expandable resin particles of the invention is readily recycled since the generation of the gel component derived from the cross-linking or graft polymerization is reduced. Still further, since the expandable resin particles of the invention are produced by impregnating the styrene-based monomer into the inside of polyethylene for polymerization, adding an additional styrene-based monomer while the polymerization of the styrene-based monomer is proceeding to a certain degree, and then simultaneously performing the impregnation and polymerization at a specific temperature, the expandable resin particles have less generation of the polymer powder and maintain a high content of the polystyrene resin component.

TABLE 5

| Polymerization Temperature (° C.) | Polymerization Initiator | Gel Fraction (%) | PS Content in Gel Component (wt %) | Powder Content (%) | M.W. Ca. (×10$^4$) | Falling Ball Impact Value (cm) | Compressive Strength (N/cm$^2$) | Recyclability |
|---|---|---|---|---|---|---|---|---|
| 110 | TBPOTMH | 0.6 | 16.6 | 0.5 | 38 | 50 | 35 | ○ |
| 112 | TBPOTMH | 0.8 | 13.7 | 0.4 | 38 | 80 | 34 | ○ |
| 114 | TBPOTMH | 0.5 | 18.0 | 0.4 | 36 | 80 | 34 | ○ |
| 115 | TBPB | 0.3 | 23.3 | 0.5 | 35 | 80 | 35 | ○ |
| 116 | TBPB | 0.7 | 14.3 | 0.5 | 33 | 80 | 35 | ○ |
| 117 | TBPB | 0.3 | 23.3 | 0.3 | 32 | 80 | 34 | ○ |
| 118 | TBPB | 1.8 | 17.7 | 0.6 | 30 | 85 | 36 | ○ |
| 119 | TBPB | 6.5 | 21.5 | 0.7 | 27 | 90 | 38 | X |
| 120 | TBPB | 18 | 20.0 | 0.7 | 28 | 100 | 40 | X |
| 121 | TBPB | 25 | 24.0 | 0.8 | 26 | 100 | 40 | X |
| 122 | TBPB | 32.2 | 26.4 | 0.7 | 25 | 100 | 42 | X |
| 123 | DCP | 19.6 | 26.5 | 0.6 | 26 | 95 | 40 | X |
| 124 | DCP | 20.1 | 24.4 | 0.7 | 26 | 100 | 42 | X |
| 125 | DCP | 4.6 | 23.9 | 0.5 | 26 | 90 | 38 | X |
| 126 | DCP | 2.6 | 20.0 | 0.6 | 27 | 85 | 38 | X |
| 128 | DCP | 1.6 | 18.7 | 0.5 | 26 | 85 | 36 | ○ |
| 130 | DCP | 0.8 | 18.7 | 0.6 | 27 | 85 | 35 | ○ |
| 132 | DCP | 2.4 | 37.5 | 0.6 | 25 | 85 | 36 | X |
| 135 | DCP | 5.2 | 25.0 | 0.5 | 22 | 90 | 38 | X |

As seen in Table 5 and FIG. 1, it is understood that the gel fraction is remarkably decreased when the polymerization temperature is in the range of the present invention (112 to 118° C. and 128 to 130° C.). When the polymerization temperature was 110° C. which is 16° C. lower than the melting point of the polyethylene-based resin, the gel fraction was not more than 2 wt %. However, the falling ball impact value was low, probably because due to insufficient polymerization of styrene.

As described hereinbefore, the present invention includes the step of impregnating the styrene-based monomer into the polyethylene-based resin particles for polymerization at a

The invention claimed is:

1. A method for producing expandable particles of a styrene-modified linear low-density polyethylene-based resin comprising, in the order recited:
dispersing 100 parts by weight of non-crosslinked linear low-density polyethylene-based resin particles, 50 to 1000 parts by weight of a styrene-based monomer, and 0.1 to 0.9 parts by weight of a polymerization initiator relative to 100 parts by weight of the styrene-based monomer into a suspension containing a dispersant;
impregnating the styrene-based monomer into the low-density polyethylene-based resin particles by heating a resultant dispersion at such a temperature that polymerization of the styrene-based monomer does not substantially take place;

performing a polymerization of the styrene-based monomer at a temperature of (T−15) to (T−8)° C. or (T+1) to (T+5)° C., T° C. being a melting point of the low-density polyethylene-based resin particles; and impregnating a volatile blowing agent into the resin particles during or after the polymerization;

whereby resin components of the expandable particles contain a gel component comprising less than 2 wt % of a graft polymer.

2. The method of claim 1, wherein 50 to 300 parts by weight of a styrene-based monomer per 100 parts of resin particles are employed.

3. The method of claim 1, wherein the non-crosslinked linear low-density polyethylene-based resin comprises a copolymer of ethylene and at least one of 1-butene, 1-pentene, 1-hexene, 3,3-dimethyl-1-butene, 4-methyl-1-pentene, 4,4-dimethyl-1-pentene, and 1-octene.

4. The method of claim 1, wherein the styrene-based monomer comprises at least one of styrene, α-methylstyrene, vinyltoluene, and chlorostyrene.

5. The method of claim 1, wherein 0.2 to 0.5 parts by weight of a polymerization initiator relative to 100 parts by weight of the styrene-based monomer are used.

6. The method of claim 1, wherein the linear low-density polyethylene-based resin particles each have a substantially spherical shape or a cylindrical shape having an L/D of from 0.6 to 1.6, L being a length of each particle and D being a diameter of each particle, and an average particle size of from 0.2 to 1.5 mm.

7. Expandable particles of a styrene-modified linear low-density polyethylene-based resin, wherein the particles are obtained by the method of claim 1.

8. Expandable particles of a styrene-modified linear low-density polyethylene-based resin, wherein the particles are obtained by the method of claim 2.

9. Pre-expanded particles having a bulk density of from 20 to 200 kg/m$^3$, obtained by pre-expanding the expandable particles of the styrene-modified linear low-density polyethylene-based resin of claim 7.

10. Pre-expanded particles having a bulk density of from 20 to 200 kg/m$^3$, obtained by pre-expanding the expandable particles of the styrene-modified linear low-density polyethylene-based resin of claim 8.

11. An expanded molded article having a density of 20 to 200 kg/m$^3$, obtained by expansion molding of the pre-expanded particles of claim 9.

12. An expanded molded article having a density of 20 to 200 kg/m$^3$, obtained by expansion molding of the pre-expanded particles of claim 10.

13. A method for producing expandable particles of a styrene-modified linear low-density polyethylene-based resin comprising, in the order recited:

dispersing 100 parts by weight of non-crosslinked linear low-density polyethylene-based resin particles, 30 to 300 parts by weight of a styrene-based monomer, and 0.1 to 0.9 parts by weight of a polymerization initiator relative to 100 parts by weight of the styrene-based monomer into a suspension containing a dispersant;

impregnating the styrene-based monomer into the low-density polyethylene-based resin particles by heating a resultant dispersion at such a temperature that polymerization of the styrene-based monomer does not substantially take place;

performing a first polymerization of the styrene-based monomer at a temperature of (T−15) to (T−8)° C. or (T+1) to (T+5)° C., T° C. being a melting point of the low-density polyethylene-based resin particles;

adding a styrene-based monomer and 0.1 to 0.9 parts by weight of a polymerization initiator relative to 100 parts by weight of the styrene-based monomer after the first polymerization has reached a conversion ratio of from 80% to 99.9%, and performing an impregnation of the styrene-based monomer into the low-density polyethylene-based resin particles and a second polymerization of the styrene-based monomer at a temperature of (T−15) to (T−8)° C. or (T+1) to (T+5)° C., T° C. being a melting point of the polyethylene-based resin particles; and impregnating a volatile blowing agent into the resin particles during or after the polymerization;

a total amount of the styrene monomers used in the first and second polymerizations being more than 50 parts by weight and not more than 1000 parts by weight relative to 100 parts by weight of the low-density polyethylene-based resin particles;

whereby resin components of the expandable particles contain a gel component comprising less than 2 wt % of a graft polymer.

14. The method of claim 13, wherein the non-crosslinked linear low-density polyethylene-based resin comprises a copolymer of ethylene and at least one of 1-butene, 1-pentene, 1-hexene, 3,3-dimethyl-1-butene, 4-methyl-1-pentene, 4,4-dimethyl-1-pentene, and 1-octene.

15. The method of claim 13, wherein the styrene-based monomer comprises at least one of styrene, α-methylstyrene, vinyltoluene, and chlorostyrene.

16. The method of claim 13, wherein 0.2 to 0.5 parts by weight of a polymerization initiator relative to 100 parts by weight of the styrene-based monomer are used.

17. The method of claim 13, wherein the linear low-density polyethylene-based resin particles each have a substantially spherical shape or a cylindrical shape having an L/D of from 0.6 to 1.6, L being a length of each particle and D being a diameter of each particle, and an average particle size of from 0.2 to 1.5 mm.

18. Expandable particles of a styrene-modified linear low-density polyethylene-based resin, wherein the particles are obtained by the method of claim 13.

19. Pre-expanded particles having a bulk density of from 20 to 200 kg/m$^3$, obtained by pre-expanding the expandable particles of the styrene-modified linear low-density polyethylene-based resin of claim 18.

20. An expanded molded article having a density of 20 to 200 kg/m$^3$, obtained by expansion molding of the pre-expanded particles of claim 19.

* * * * *

UNITED STATES PATENT AND TRADEMARK OFFICE
CERTIFICATE OF CORRECTION

PATENT NO. : 7,767,723 B2  Page 1 of 1
APPLICATION NO. : 10/540866
DATED : August 3, 2010
INVENTOR(S) : Hideyasu Matsumura et al.

It is certified that error appears in the above-identified patent and that said Letters Patent is hereby corrected as shown below:

On the Title Page at Item (54), and Col. 1, lines 1-5, Title, "EXPANDABLE RESIN PARTICLES OF STYRENE-MODIFIED STRAIGHT-CHAIN AND LOW-DENSITY POLYETHYLENE, PROCESS THE PRODUCTION THEREOF, PRE-EXPANDED PARTICLES, AND FOAMS" should read --EXPANDABLE PARTICLES OF STYRENE-MODIFIED LINEAR LOW-DENSITY POLYETHYLENE-BASED RESIN, PRODUCTION METHOD THEREFOR, PRE-EXPANDED PARTICLES, AND EXPANDED MOLDED ARTICLE--.

On the Title Page at Item (57), ABSTRACT, line 2, "beads" should read --particles--.

Signed and Sealed this

Ninth Day of November, 2010

David J. Kappos
*Director of the United States Patent and Trademark Office*